US007890199B2

(12) United States Patent
Inagaki

(10) Patent No.: US 7,890,199 B2
(45) Date of Patent: Feb. 15, 2011

(54) STORAGE MEDIUM STORING SOUND OUTPUT CONTROL PROGRAM AND SOUND OUTPUT CONTROL APPARATUS

(75) Inventor: Yoji Inagaki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1095 days.

(21) Appl. No.: 11/482,799

(22) Filed: Jul. 10, 2006

(65) Prior Publication Data

US 2007/0255434 A1 Nov. 1, 2007

(30) Foreign Application Priority Data

Apr. 28, 2006 (JP) ............................ 2006-124830

(51) Int. Cl.
*G06F 17/00* (2006.01)
*A63F 13/02* (2006.01)

(52) U.S. Cl. ............................ 700/94; 463/35; 463/36; 463/37; 381/124

(58) Field of Classification Search .................. 700/94; 381/61, 124; 463/35-38, 43, 1-5; 704/270, 704/272, 278; 84/601, 604; 702/127, 141
See application file for complete search history.

(56) References Cited

U.S. PATENT DOCUMENTS

| | | | | |
|---|---|---|---|---|
| 4,839,838 | A * | 6/1989 | LaBiche et al. | 708/141 |
| 5,128,671 | A * | 7/1992 | Thomas, Jr. | 341/20 |
| 6,150,947 | A * | 11/2000 | Shima | 340/692 |
| 6,545,661 | B1 * | 4/2003 | Goschy et al. | 345/158 |
| 6,908,386 | B2 * | 6/2005 | Suzuki et al. | 463/30 |
| 7,474,197 | B2 * | 1/2009 | Choi et al. | 340/384.7 |
| 7,491,879 | B2 * | 2/2009 | Hikino et al. | 84/615 |
| 7,658,676 | B2 * | 2/2010 | Ohta | 463/37 |
| 7,679,601 | B2 * | 3/2010 | Chang et al. | 345/156 |
| 7,716,008 | B2 * | 5/2010 | Ohta | 702/152 |
| 2007/0012167 | A1 * | 1/2007 | Bang et al. | 84/723 |
| 2008/0060502 | A1 * | 3/2008 | Hasebe | 84/609 |
| 2008/0242385 | A1 * | 10/2008 | Miyamoto | 463/1 |
| 2009/0069096 | A1 * | 3/2009 | Nishimoto | 463/43 |
| 2009/0318227 | A1 * | 12/2009 | Nakajima | 463/35 |

FOREIGN PATENT DOCUMENTS

| | | |
|---|---|---|
| JP | 63-192096 | 8/1988 |
| JP | 04-184490 | 7/1992 |
| JP | 05-080756 | 4/1993 |
| JP | 07-121294 | 5/1995 |

(Continued)

OTHER PUBLICATIONS

Office Action dated Jul. 6, 2010 issued in corresponding Japanese Application No. 2006-124830.

*Primary Examiner*—Xu Mei
(74) *Attorney, Agent, or Firm*—Nixon & Vanderhye P.C.

(57) ABSTRACT

A sound output control apparatus includes a controller for a user to perform a stroke operation. The controller is provided with an acceleration sensor for detecting accelerations of two axes, for example. The sum of the accelerations is calculated, and the output of a sound is controlled in accordance with a change in the sum of the accelerations. More specifically, when the sum of the accelerations exceeds each of threshold values associated with strings of a string instrument such as a guitar, a sound corresponding to the threshold value is output.

8 Claims, 10 Drawing Sheets

FOREIGN PATENT DOCUMENTS

| | | |
|---|---|---|
| JP | 10-055174 | 2/1998 |
| JP | 2000-267659 | 9/2000 |
| JP | 2000-276141 | 10/2000 |
| JP | 2000-330567 | 11/2000 |
| JP | 2001-013967 | 1/2001 |
| JP | 2002-023742 | 1/2002 |
| JP | 2003-076368 | 3/2003 |
| JP | 2004-053930 | 2/2004 |

* cited by examiner (A)

(B)

(A)

(B)

STRING THRESHOLD VALUE TABLE

| STRING NUMBER | THRESHOLD VALUE |
|---|---|
| 6TH STRING | 0.25 |
| 5TH STRING | 0.35 |
| 4TH STRING | 0.45 |
| 3RD STRING | 0.55 |
| 2ND STRING | 0.65 |
| 1ST STRING | 0.75 |

STORAGE MEDIUM STORING SOUND OUTPUT CONTROL PROGRAM AND SOUND OUTPUT CONTROL APPARATUS

CROSS REFERENCE OF RELATED APPLICATION

The disclosure of Japanese Patent Application No. 2006-124830 is incorporated herein by reference.

BACKGROUND

1. Field

Example embodiments of the present invention relate to a storage medium storing a sound output control program and a sound output control apparatus. More specifically, example embodiments of the present invention relate to a storage medium storing a sound output control program for simulative playing by outputting a sound in accordance with swinging an operating device, and a sound output control apparatus.

2. Description of the Related Art

One example of simulative playing apparatus outputting a music instrument sound in accordance with the motion of swinging an operating device is disclosed in document 1 (Japanese Patent Application Laying-open No. 2000-330567) and document 2 (Japanese Patent Application Laying-open No. S63-192096). In the related art of document 1, a shock sensor is attached to the palm of a hand, and when a stick is swung by the hand, an impact resulting from a collision between the impact sensor and the stick is detected, and the sound of a music instrument such as a drum is output according to the detected impact.

Also, in the related art of document 2, different control signals are generated depending on the angle of swinging an operating member. More specifically, the angle of lifting the operating member is detected with use of mercury and a plurality of contact points, based on the fact that mercury reaches a different contact point depending on the degree of inclination of the operating member, and then a music instrument sound is output at a pitch according to the detected angle.

In the related art of document 1, since the impact of swinging the stick is detected, it is not allowed to implement simulative playing of music instruments other than percussion. For instance, even if an attempt is made to apply this related art to wristy playing such as guitar stroke performance, the performance will be absolutely different from the guitar stroke performance. Moreover, in the related art of document 2, the angle of swinging the operating member is detected by the mercury switch, but this technique is not regarded as practical, considering the cost of the entire apparatus and the danger of the used member. Further, it is unlikely that this related art can detect an action such as guitar stroke playing with accuracy.

SUMMARY

Therefore, it is an aspect of example embodiments of the present invention to provide a novel storage medium storing a sound output control program and a novel sound output control apparatus.

It is another aspect of example embodiments of the present invention to provide a storage medium storing a sound output control program and a sound output control apparatus that allows simulative stroke performance by swinging a controller.

A storage medium storing a sound output control program as a first example embodiment of the present invention is a storage medium storing a sound output control program for a sound output control apparatus that outputs a sound from an output means in accordance with manipulation of an operating means. The operating means comprises an acceleration sensor for detecting accelerations in directions of at least two axes orthogonal to each other. The sound output control program of the storage medium allows a processor of the sound output control apparatus to execute an acquisition step, a calculation step, a sound control step, and a sound output step. In the acquisition step, the accelerations are detected by the acceleration sensor. In the calculation step, sum of the accelerations of two axes acquired in the acquisition step is calculated. In the sound control step, a control signal for sound output is generated in accordance with a change in the sum of the accelerations. In the sound output step, a sound is output from the output means based on the control signal.

More specifically, the sound output control program stored in the storage medium is intended to output a sound from the output means (24: a reference numeral corresponding to that used in a description of the embodiments. The same applies to following numerals.) in accordance with a user's manipulation of the operating means (14), and includes steps to be executed by the processor (26) of the sound output control apparatus (10), described below. Besides, the operating means is provided with the acceleration sensor (60) for detecting accelerations in directions of at least two axes orthogonal to each other. The user holds and swings the operating means as if carrying out guitar stroke performance, for instance. In the acquisition step (S3), the accelerations detected by the acceleration sensor are acquired, and in the calculation step (S25), the sum of accelerations of two axes is calculated. The sum of the accelerations indicates the state of the user's stroke operation with the operating means. In the sound control step (S27 to S41), a control signal is generated for sound output according to a change in the sum of the accelerations. In the sound output step (S43), a sound is output from the output means based on the control signal. In this manner, the sound is output in accordance with the state of the user's stroke operation.

As stated above, example embodiments of the present invention allow sound output in accordance with the state of an operation represented by the sum of accelerations of two axes, even for guitar playing that cannot be reproduced by simple pointing, like stroke performance, for example. Thus, simulative stroke performance can be implemented.

In one embodiment, the sound control step includes a determination step of determining whether a change in the sum of the accelerations has formed a predetermined relationship with any of a plurality of threshold values stored in a storage means. When it is determined in the determination step that a change in the sum of the accelerations has formed a predetermined relationship with the threshold value, the control signal for sound output is generated.

More specifically, it is determined in the determination step (S33, S37) whether or not a change in the sum of the accelerations has formed a predetermined relationship with any of the plurality of threshold values. The plurality of threshold values are stored in the storage means (28). In the embodiments described later, the plurality of threshold values are associated with the strings of a string instrument such as a guitar, and stored as string threshold value table data. The predetermined relationship represents that the sum of the accelerations has changed in excess of the threshold value, and more specifically that the string associated with the threshold value has been twanged. In the sound control step, when it is determined that the change in the sum of the accelerations has formed the predetermined relationship with the threshold value, a control signal for sound output is generated. For example, the control is exercised in such a manner that a sound associated with the threshold value is output.

As aforesaid, further, since sound output is controlled according to whether the sum of the accelerations has went beyond each of the predetermined plurality of threshold values, it is possible to simulatively make a plurality of sounds with time differences according to the user's operation, as if a real guitar does, by setting in advance the individual threshold values corresponding to six guitar strings, for instance.

In another embodiment, in the sound control step, a tone of sound to be output is selected on the basis of a change in the sum of the accelerations.

More specifically, whenever the sum of the accelerations has had a predetermined change, for example, whenever the sum of the accelerations has formed a predetermined relationship with the threshold value, a different sound is selected and output. Accordingly, setting different sounds to the six guitar strings would make it possible to produce different sounds among the threshold values, for example, whereby simulative guitar playing can be implemented in further accordance with a real chord.

In another embodiment, the operating means further comprises a sound emission instruction means for providing an instruction on whether or not to carry out sound output. In the sound control step, the presence or absence of the sound output is controlled in accordance with the instruction from the sound emission instruction means.

More specifically, the operating means is provided with the sound emission instruction means (**52*d***). An instruction on whether or not to output a sound is provided according to the user's operation on the sound emission instruction means. In the sound control step, the presence or absence of sound output is controlled in accordance with the instruction. Thus, since control is further exercised on whether or not to actually emit a sound from a speaker or the like, it is also possible to adjust the presence or absence of sound emission with respect to sound output according to a change in the sum of the accelerations, making it possible to output the sound of only a single string in simulative guitar playing, for example.

A sound output control apparatus of a second example embodiment of present invention is a sound output control apparatus for outputting a sound from an output means in accordance with manipulation of an operating means having an acceleration sensor for detecting accelerations in directions of at least two axes orthogonal to each other. The sound output control apparatus comprises an acquisition means, a calculation means, a sound control means, and a sound output means. The acquisition means acquires accelerations detected by the acceleration sensor. The calculation means calculates sum of the accelerations of two axes acquired by the acceleration means. The sound control means generates a control signal for sound output in accordance with a change in the sum of the accelerations. The sound output means outputs a sound from the output means based on the control signal.

The second example embodiment is a sound output control apparatus corresponding to the above mentioned first example embodiment, and offers the same advantages as those of the aforesaid first example embodiment.

According to example embodiments of the present invention, since a sound is controlled in accordance with a change in the sum of accelerations of two axes detected by the acceleration sensor provided in the operating means, it is possible to carry out simulative playing by a wristy operation like guitar stroke performance. The sound output can be controlled in accordance with the state of the operation such as swinging the operating means, even for music performance that cannot be reproduced by simple pointing, which makes it possible to provide an apparatus that can offer entertaining sound output never before possible.

The above described features, aspects and advantages of example embodiments of the present invention will become more apparent from the following detailed description of example embodiments of the present invention when taken in conjunction with the accompanying drawings.

BRIEF DESCRIPTION OF THE DRAWINGS

FIG. 3(A) is an oblique perspective view from the upper rear side and FIG. 3(B) is an oblique perspective view from the lower rear side;

FIG. 5(A) shows a motion seen from the user side, and FIG. 5(B) shows a motion seen from the left side of the user;

DETAILED DESCRIPTION OF THE NON-LIMITING EXAMPLE EMBODIMENTS

Figure 1:
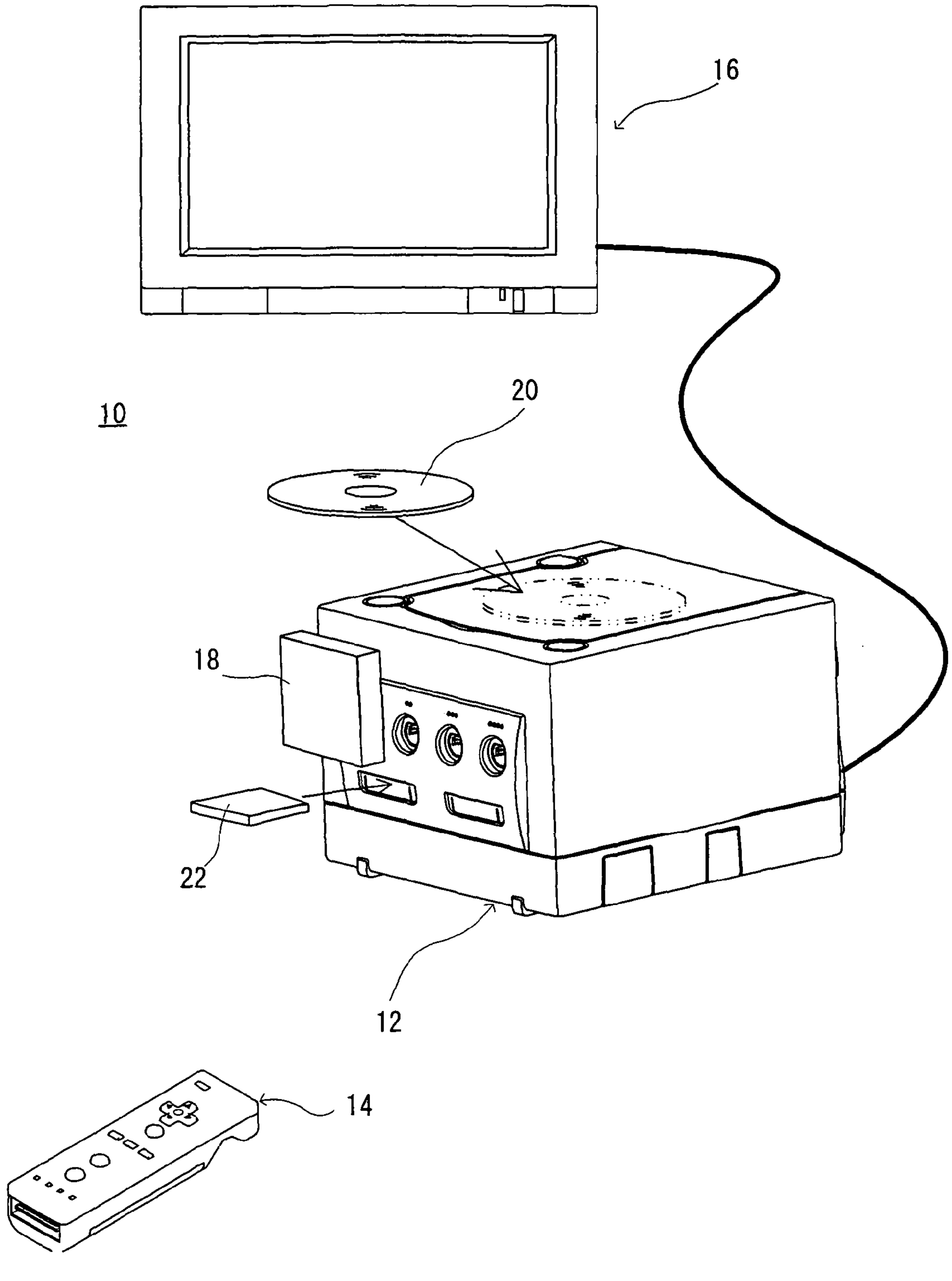
FIG. 1 is an outline view showing one example of sound output control apparatus in one example embodiment of the present invention.

Referring to FIG. 1, a sound output control apparatus 10 of this embodiment is implemented in the form of a game system as an example. The game system 10 includes a game apparatus 12 and a controller 14. The game apparatus 12 is a game console connected via a cable to a display or monitor 16 such as a home television receiver. The controller 14 is an operating device that is manipulated by a player or user and provides operation data to the game apparatus 12.

The game apparatus 12 is connected with a receiving unit 18 via a connection terminal. The receiving unit 18 receives operation data transmitted wirelessly from the controller 14. More specifically, the controller 14 uses a wireless communication technique such as Bluetooth (registered trademark) to transmit operation data to the game apparatus 12 to which the receiving unit 18 is connected.

In addition, an optical disc 20 is attached to or detached from the game apparatus 12, as an example of information storage medium that is replaceably used in the game apparatus 12. Provided on an upper main surface of the game apparatus 12 are a power ON/OFF switch for the game apparatus 12, a reset switch for game processing and an OPEN switch for opening the upper cover of the game apparatus 12. When the player presses the OPEN switch, the aforesaid cover is opened, whereby the optical disc 20 is attached to or detached from the game apparatus 12. Moreover, an external memory card 22 is detachably attached to the game apparatus 12 as required. A flash memory etc. contained in the memory card 22 store saved data and the like.

The game apparatus 12 executes a game program stored in the optical disc 20 and displays results of the execution as a game image on the monitor 16. The game apparatus 12 may also use saved data stored in the external memory card 22 to reproduce the state of a game executed in the past and display the game image on the monitor 16. A speaker 24 (see FIG. 2) provided in the monitor 16 outputs a game sound (according to the user's performance in this embodiment). The player plays a virtual game by operating the controller 14 (carrying out simulative performance in this embodiment).

Figure 2:
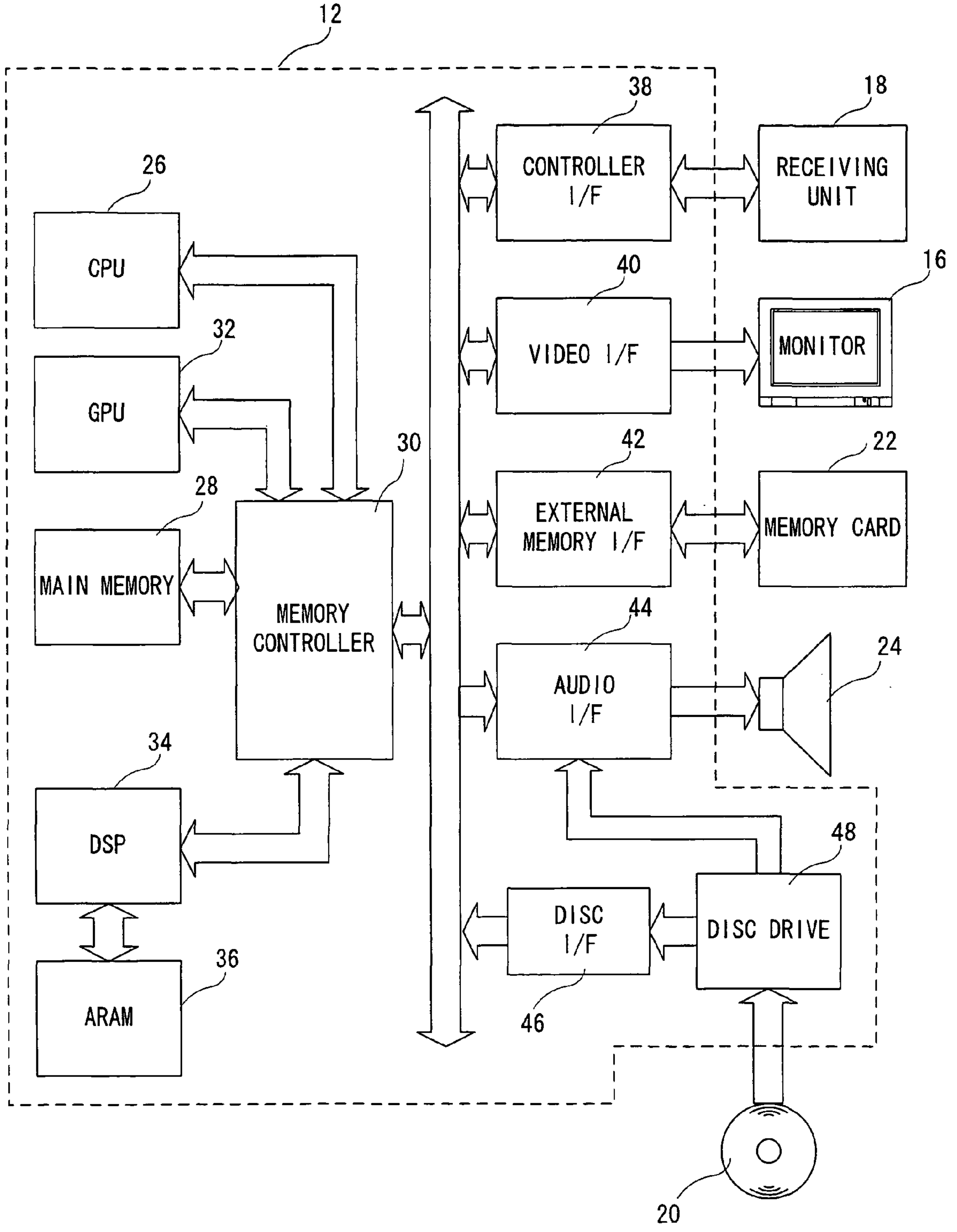
FIG. 2 is a block diagram showing one example of electric configuration of a game apparatus of FIG. 1.

FIG. 2 shows one example of electric configuration of the game apparatus 12. The game apparatus 12 includes a RISC CPU (Central Processing Unit) 26 for executing various programs, for example. The CPU 26 executes a boot program stored in a boot ROM not shown, initializes memories such as a main memory 28, loads a game program (sound output control program in this embodiment) and data stored in the optical disc 20, and then carries out game processing according to the game program.

The CPU 26 is connected via a memory controller 30 with a GPU (Graphics Processing Unit) 32, the main memory 28, a DSP (Digital Signal Processor) 34, and an ARAM (Audio RAM) 36. The memory controller 30 is connected via a predetermined bus with a controller I/F (Interface) 38, a video I/F 40, an external memory I/F 42, an audio I/F 44, and a disc I/F 46, which are connected with the receiving unit 18, the monitor 16, the external memory card 22, the speaker 24, and the disc drive 48, respectively.

The GPU 32 performs image processing under instructions from the CPU 26. For example, the GPU 32 is formed by a semiconductor chip that performs calculations required for display of 3D graphics. For image processing, the GPU 32 uses a memory dedicated for image processing and some storage area of the main memory 28. The GPU 32 generates game image data and movie pictures to be displayed, and outputs them to the monitor 16 via the memory controller 30 and the video I/F 40 as appropriate.

The main memory 28 is a storage area used by the CPU 26, and stores appropriately a game program and data required by the CPU 26 for game processing. For instance, the main memory 28 stores the game program and various kinds of data, etc. read by the CPU 26 from the optical disc 20.

The DSP 34 serves as a sound processor connected with the ARAM 36 for storage of sound data, etc. The ARAM 36 is used for a predetermined process (e.g. storing previously read game program and sound data). The DSP 34 reads the sound data (sound wave data) stored in the ARAM 36, generates data for sound output based on the sound control data from the CPU 26 and the sound wave data and the like, outputs the sound from the speaker 24 provided in the monitor 16 via the memory controller 30 and the audio I/F 44.

The memory controller 30 controls centrally data transfer and is connected with the above mentioned I/Fs. The controller I/F 38 is formed by four controller I/Fs, for example, and connects the game apparatus 12 communicably with an external device via connectors possessed by those controller I/Fs. For instance, the receiving unit 18 is engaged with the above mentioned connector and connected to the game apparatus 12 via the controller I/F 38. As described above, the receiving unit 18 receives operation data from the controller 14, and outputs it to the CPU 26 via the controller I/F 38. In another embodiment, the game apparatus 12 may contain inside a receiving module for receiving operation data transmitted from the controller 14, instead of the receiving unit 18. In this case, the transmission data received by the receiving module is output to the CPU 26 via a predetermined bus.

The video I/F 40 is connected with the monitor 16 on which a game image is displayed according to an image signal from the video I/F 40. The external memory I/F 42 is connected with the external memory card 22. The CPU 26 accesses a flash memory, etc. provided in the external memory card 22 via the memory controller 30.

The audio I/F 44 is connected with the speaker 24 contained in the monitor 16. The audio I/F 44 provides the speaker 24 with an audio signal corresponding to sound data read from the ARAM 36 or generated by the DSP 34 and the sound data directly output from the disc drive 48. The speaker 24 outputs the sound.

The disc I/F 46 is connected with the disc drive 48 which reads data stored in the optical disc 20 in a predetermined reading position. The read data is written into the main memory 28 via the disc I/F 46 and the memory controller 30, etc., or is output to the audio I/F 44.

Figure 3:
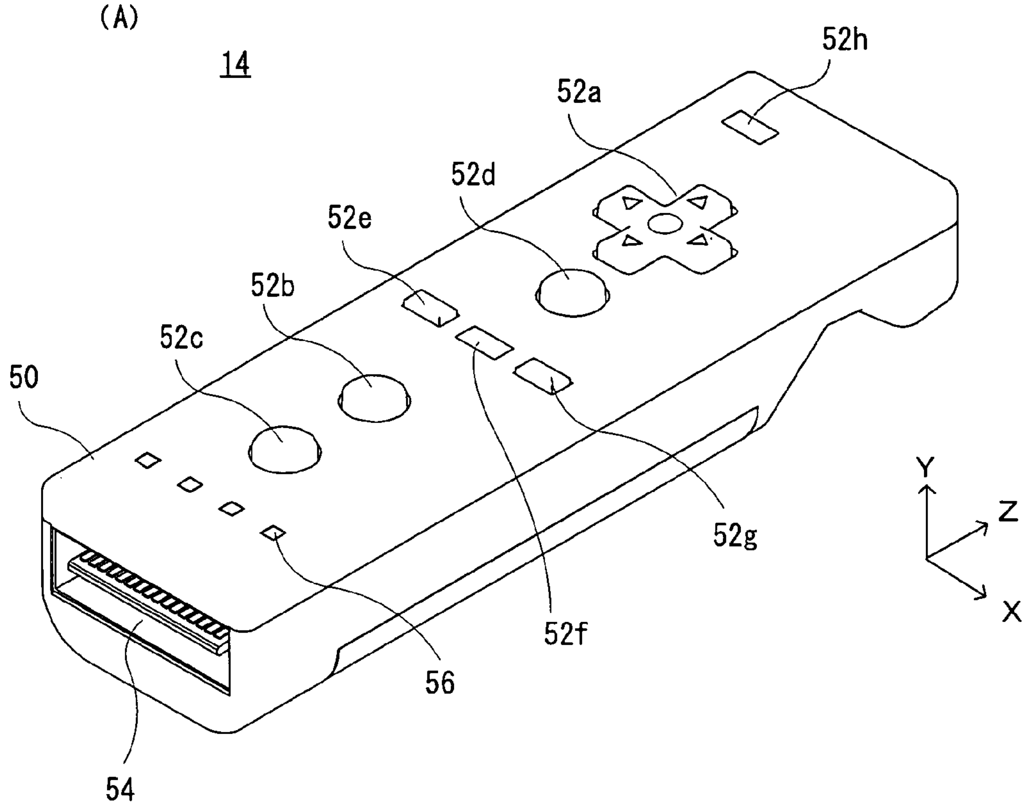
FIG. 3 is an illustrative view showing one example of controller of FIG. 1.
Figure 3:
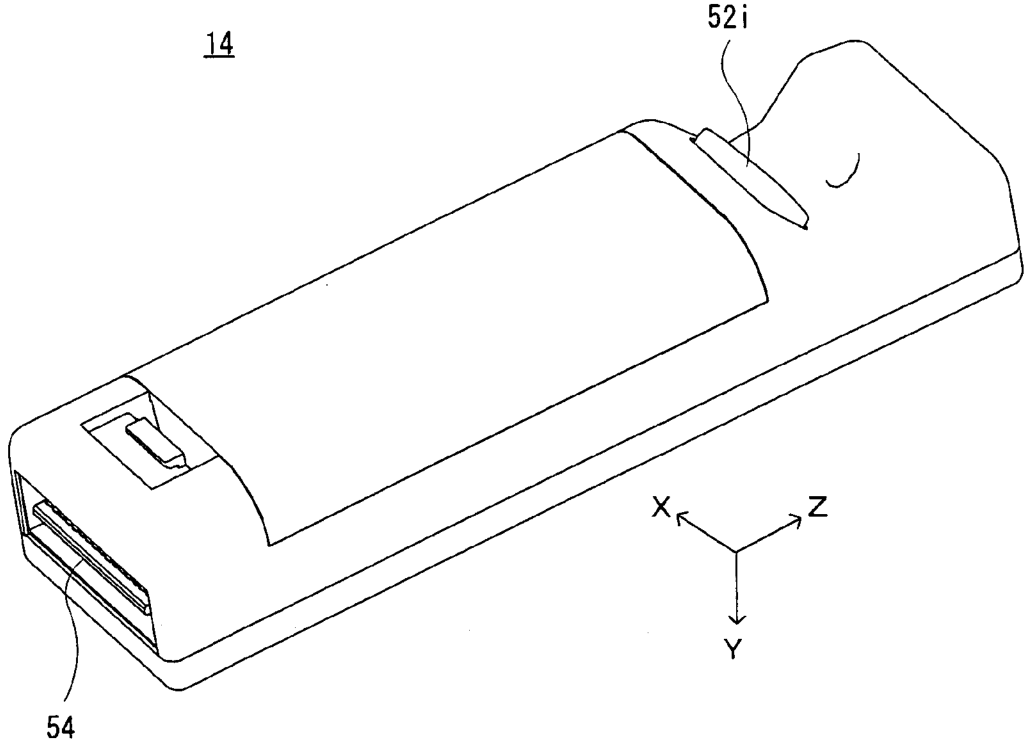

FIG. 3 shows one example of outline view of the controller 14. FIG. 3(A) is an oblique perspective view of the controller 14 seen from the upper rear side, and FIG. 3(B) is an oblique perspective view of the controller 14 seen from the lower rear side.

The controller 14 has a housing 50 formed by plastic molding, for example. The housing 50 is of an approximately rectangle with longer sides in the back-and-forth direction (Z-axis direction shown in FIG. 3), and is of size capable of being held by one hand of an adult or child as a whole. As an example, the housing 50 has almost the same length or width as human's palm of hand. The player can perform game operations by pressing buttons arranged on the controller 14 or by changing the position or orientation of the controller 14 itself. In one game, for instance, the player can move a target object by rotating the controller 14 along its length.

The housing 50 is provided with a plurality of operating buttons. Provided on an upper surface of the housing 50 are a cross key 52*a,* an X button 52*b,* a Y button 52*c,* an A button 52*d,* a select switch 52*e,* a menu switch 52*f,* and a start switch 52*g*. Meanwhile, a lower surface of the housing 50 has a concave portion, and a B button 52*i* is provided on a rear-side inclined surface of the concave portion. Each of these buttons (switches) 52 is given a function according to a game program executed by the game apparatus 12. In addition, a power switch 52*h* for remotely turning on/off the game apparatus 12 is provided on the upper surface of the housing 50.

Moreover, a connector 54 is provided on a rear surface of the housing 50. The connector 54 is, for example, a 32-pin edge connector used for connection of another device to the controller 14. A plurality of LEDs 56 are provided at a rear side of the upper surface of the housing 50. The controller 14 is given a controller type (number) for discrimination from other controllers 14. When the controller 14 transmits operation data to the game apparatus 12, one LED 56 corresponding to the currently set controller type of the controller 14 lights up.

Figure 4:
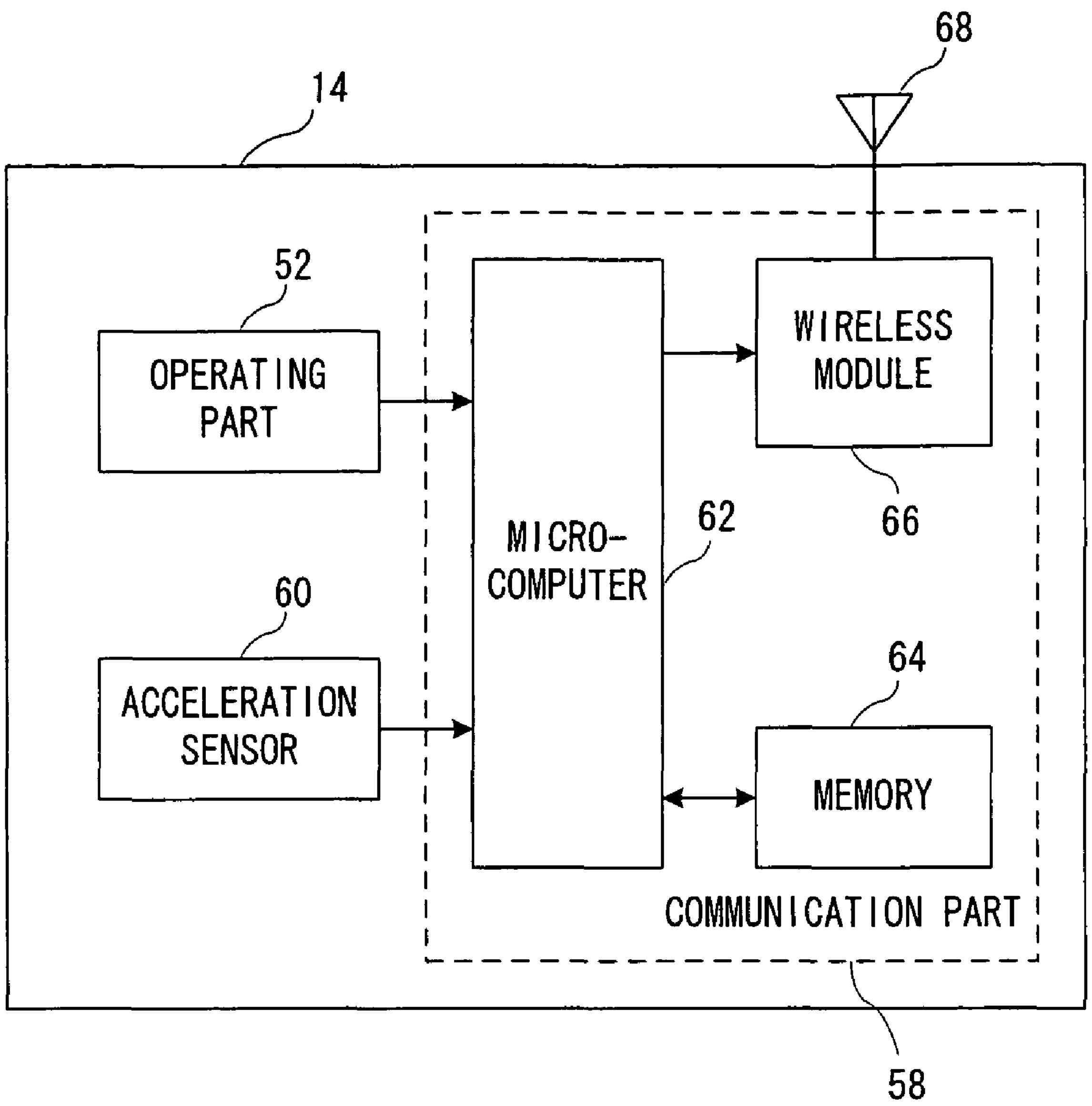
FIG. 4 is a block diagram showing one example of electric configuration of a controller of FIG. 1.

FIG. 4 shows an electrical configuration of the controller 14. The controller 14 comprises inside a communication part 58 and an acceleration sensor 60 as well as the operating part 52 (the operating buttons 52*a* to 52*h*).

The acceleration sensor 60 detects, out of accelerations applied to a detection part of the acceleration sensor, the acceleration of a line component for each sensing axis and the acceleration of gravity. The acceleration sensor 60 detects accelerations in directions of at least two axes orthogonal to each other. For example, the biaxial or triaxial acceleration sensor detects the accelerations applied to the detection part of the acceleration sensor, as accelerations of straight line components along the axes. More specifically, in this embodiment, the triaxial acceleration sensor is used to detect the accelerations of the controller 14 in the directions of the three axes, the up-and-down direction (Y-axis direction in FIG. 3), the right-and-left direction (X-axis direction in FIG. 3) and the back-and-forth direction (Z-axis direction in FIG. 3). Additionally, it is possible to calculate the inclination and rotation of the controller 14 by subjecting each of the accelerations detected for the axes by the acceleration sensor 60 to a predetermined arithmetical operation. For example, the acceleration of gravity is always applied to the acceleration sensor 60 in a stationary state, and the acceleration of each axis is detected according to the inclination of each axis with respect to the acceleration of gravity. More specifically, when the acceleration sensor 60 is standing still in a horizontal position, the acceleration of gravity of 1 G is applied to the Y axis of the acceleration sensor, and the accelerations of the other axes become approximately zero. Then, when the acceleration sensor 60 is inclined from a horizontal position, the acceleration of gravity is distributed among the axes of the acceleration sensor 60 according to the angle between the direction of each axis and the direction of gravity of the acceleration sensor 60, and the value of acceleration of each axis of the acceleration sensor 60 is detected. As above, by performing an arithmetical operation with the value of acceleration of each axis, it is possible to calculate the position of the acceleration sensor 60 with respect to the direction of gravity.

Figure 5:
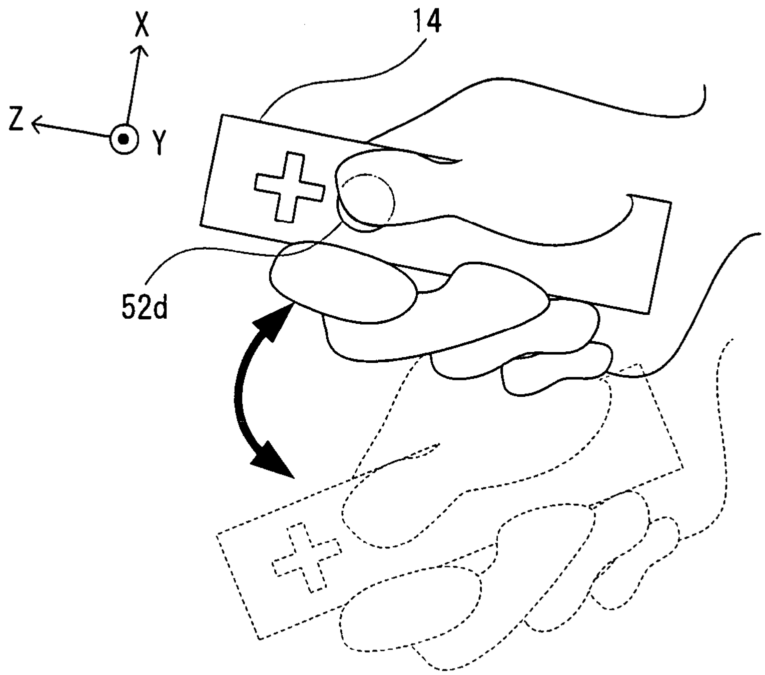
FIG. 5 is an illustrative view showing a manner of operating the controller in stroke performance.
Figure 5:
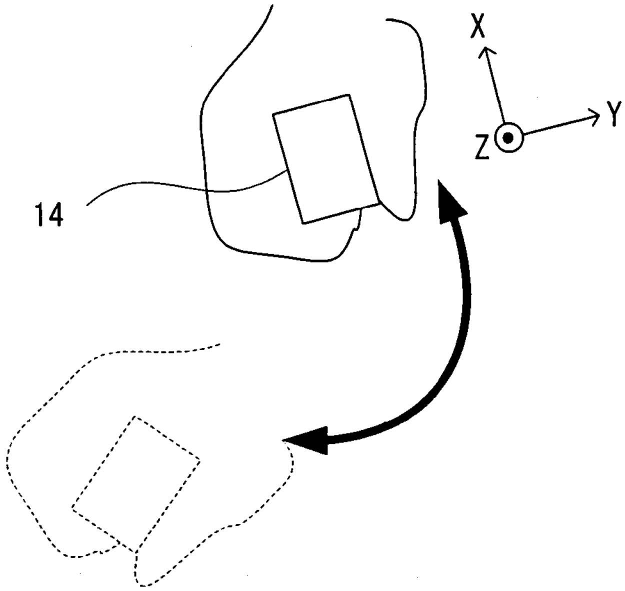

For the acceleration sensor 60, a biaxial acceleration sensor may be used to detect the accelerations in any combination of directions of two axes among the up-and-down direction, the right-and-left direction and the back-and-forth direction, depending on the kind of a required operation signal. In this embodiment, the acceleration sensor 60 detects the state of an operation such as the user's stroke performance on the controller 14. As shown in FIG. 5 described later, since the user holds and operates the controller 14 while keeping the longer side of the housing 50 in an approximately horizontal position and directing the upper surface of the housing 50 toward him/her, the acceleration sensor 60 for detecting two axes along the back-and-forth direction (Z-axis direction) and the left-and-right direction (X-axis direction) with respect to the housing 50.

Data on the accelerations detected by the acceleration sensor 60 is output to the communication part 58. The acceleration sensor 60 is typically a capacitance-type acceleration sensor. The acceleration sensor 60 has a sampling cycle of 200 frames per second at the maximum, for example.

The communication part 58 includes a microcomputer 62, a memory 64, a wireless module 66 and an antenna 68. The microcomputer 62 controls the wireless module 66 for transmitting acquired data wirelessly while using the memory 64 as a storage area during the process.

The data output from the operating part 52 and the acceleration sensor 60 to the microcomputer 62 is temporarily stored in the memory 64. Here, wireless transmission from the communication part 58 to the receiving unit 18 is carried out in a predetermined cycle. Since the game process is generally performed each 1/60 second, the wireless transmission needs to be carried out in a shorter cycle. When timing for transmission to the receiving unit 18 has come, the microcomputer 62 outputs the data stored in the memory 64 as operation data to the wireless module 66. The wireless module 66 uses Bluetooth (registered trademark) technique to modulate a carrier wave at a predetermined frequency by operation data and emit a weak radio wave signal through the antenna 68. That is, the operation data is modulated in the wireless module 66 into a weak radio wave signal and transmitted from the controller 14. The weak radio wave signal is received by the receiving unit 18 of the game apparatus 12. By demodulating or decoding the received weak radio wave signal, the game apparatus 12 can obtain the operation data. The CPU 26 of the game apparatus 12 performs the game processing based on the operation data acquired from the controller 14.

The shape of the controller 14, and the shapes, number and layout of the operating switches 52, as shown in FIG. 3, are mere examples and may be changed as appropriate to any other shapes, numbers and layouts.

Through the use of the controller 14, the player can perform game operations such as moving and rotating the controller 14 in addition to conventional typical game operations such as pressing the operating switches.

The sound output control apparatus 10 is allowed to output a sound by swinging the controller 14 as if carrying out stroke performance on a guitar, etc. More specifically, with the game system 10, the user can carry out simulative stroke guitar performance by holding the controller 14 and performing a wristy stroke operation on the same.

FIG. 5 shows the manners in which the controller 14 is held and operated. In FIG. 5, the controller 14 is handled by right hand. FIG. 5(A) shows a view from the user side, and FIG. 5(B) represents a view from the left side of the user. The user holds the controller 14 in an approximately horizontal position in such a manner as to direct the upper surface of the housing 50 toward the user and direct the front edge of the same toward the left side of the user while placing his/her thumb along the longitudinal direction on the upper surface of the housing 50. In other words, the user holds the controller 14 in such a manner that a Z-axis normal direction points to the left side of the user and an X-axis normal direction points to the upper side of the user. Then, as illustrated in FIG. 5, the user swings the controller 14 with a wristy motion in a vertical direction as if carrying out stroke performance.

The acceleration sensor 60 detects the acceleration with which the above mentioned stroke performance is carried out on the controller 14. The inventor et al. have found out that the value of sum of accelerations in the Z-axis direction and in the X-axis direction detected during operation of the controller 14 with stroke performance varies depending on the position of the operated controller 14, and that assigning a specific value to a specific string would allow simulative playing with a sense of operation like stroke performance.

Figure 6:
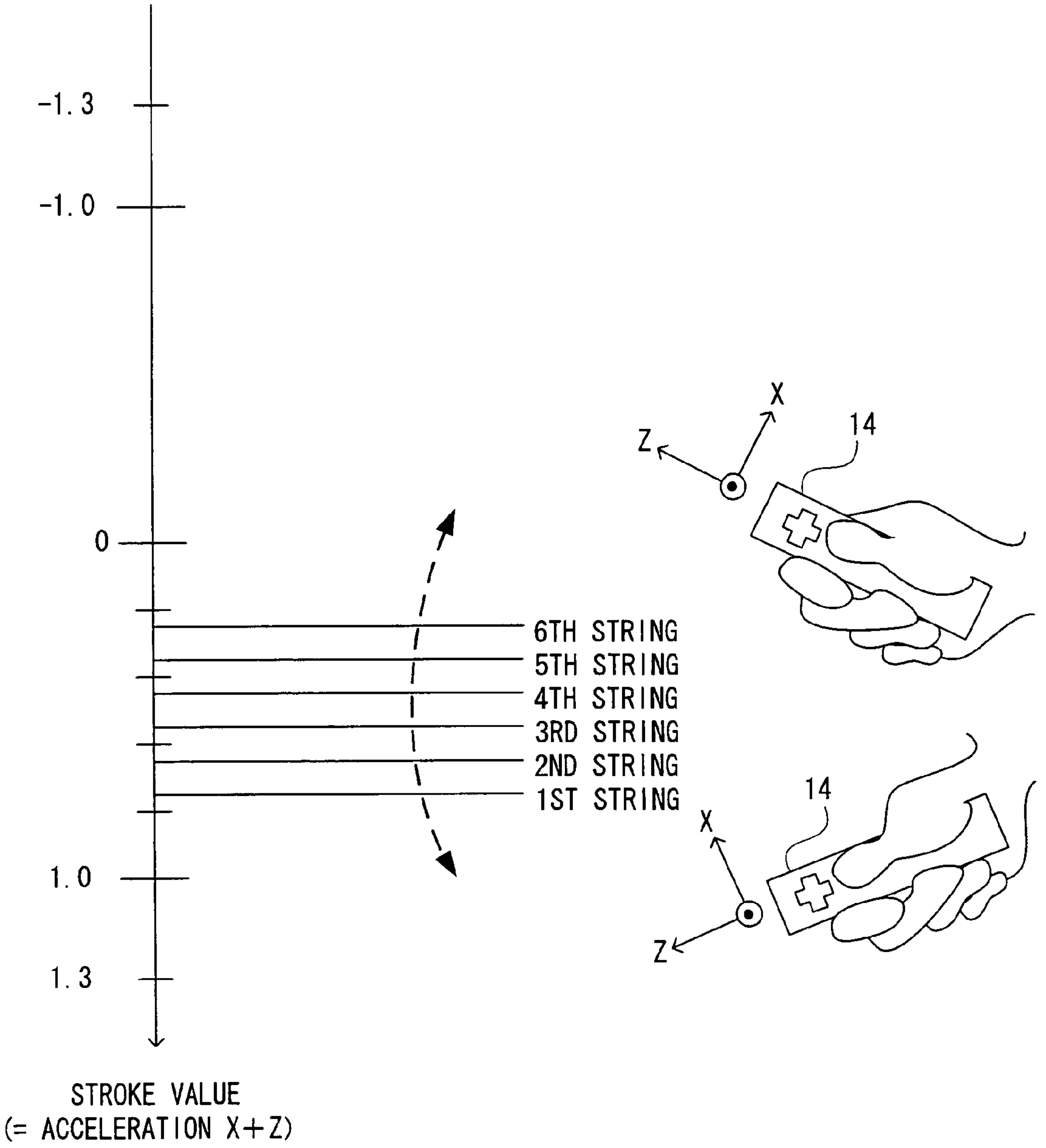
FIG. 6 is an illustrative view showing one example of relationship between stroke values varying depending on the operation condition of the controller and the threshold values of strings.

More specifically, as shown in FIG. 6, when the user swings the controller 14 as if carrying out stroke performance, the value of sum of accelerations in the X-axis direction and in the Z-axis direction of the acceleration sensor 60 varies within a predetermined range. The value of sum of accelerations in the X-axis direction and in the Z-axis direction represents the state of a stroke operation, and thus is referred to as stroke value. Assuming that the gravity acceleration is 1.0, for example, an experiment has revealed that the stroke value falls within a range from about −1.3 (the hand in the highest position) to 1.3 (the hand in the lowest position). In addition, predetermined positions (specific stroke values) are associated with the positions of the strings so that sounds are output by swinging the hand in the same manner as carrying out stroke performance on a real guitar. In this embodiment, predetermined values ranging from 0.25 to 0.75 are associated with the positions of the sixth to first guitar strings.

In the game apparatus 12, it is determined that a change in the stroke value has formed a predetermined relationship with the threshold value of each string when the predetermined relationship has been formed, that is, when the stroke value has passed through the value associated with each string, the string is assumed to be plucked and then the sound associated with the string is output.

As stated above, sound output is controlled according to a predetermined relationship between a change in the stroke value and a predetermined plurality of threshold values. Therefore, as in the case with this embodiment, by previously setting as appropriate the threshold values in correspondence with the six guitar strings, for example, it is possible to reproduce, by executing a simple process, simulative playing in which a plurality of strings make sounds with time differences like a real guitar.

In addition, different sounds can be associated with the threshold values that are compared to a change in stroke values, allowing different sounds to be sequentially output by one stroke operation. As in the case with this embodiment, by setting predetermined different tones of sounds to the six guitar strings, for example, it is possible to reproduce simulative playing by a simple operation as if producing the same chords as a real guitar makes.

Figure 7:
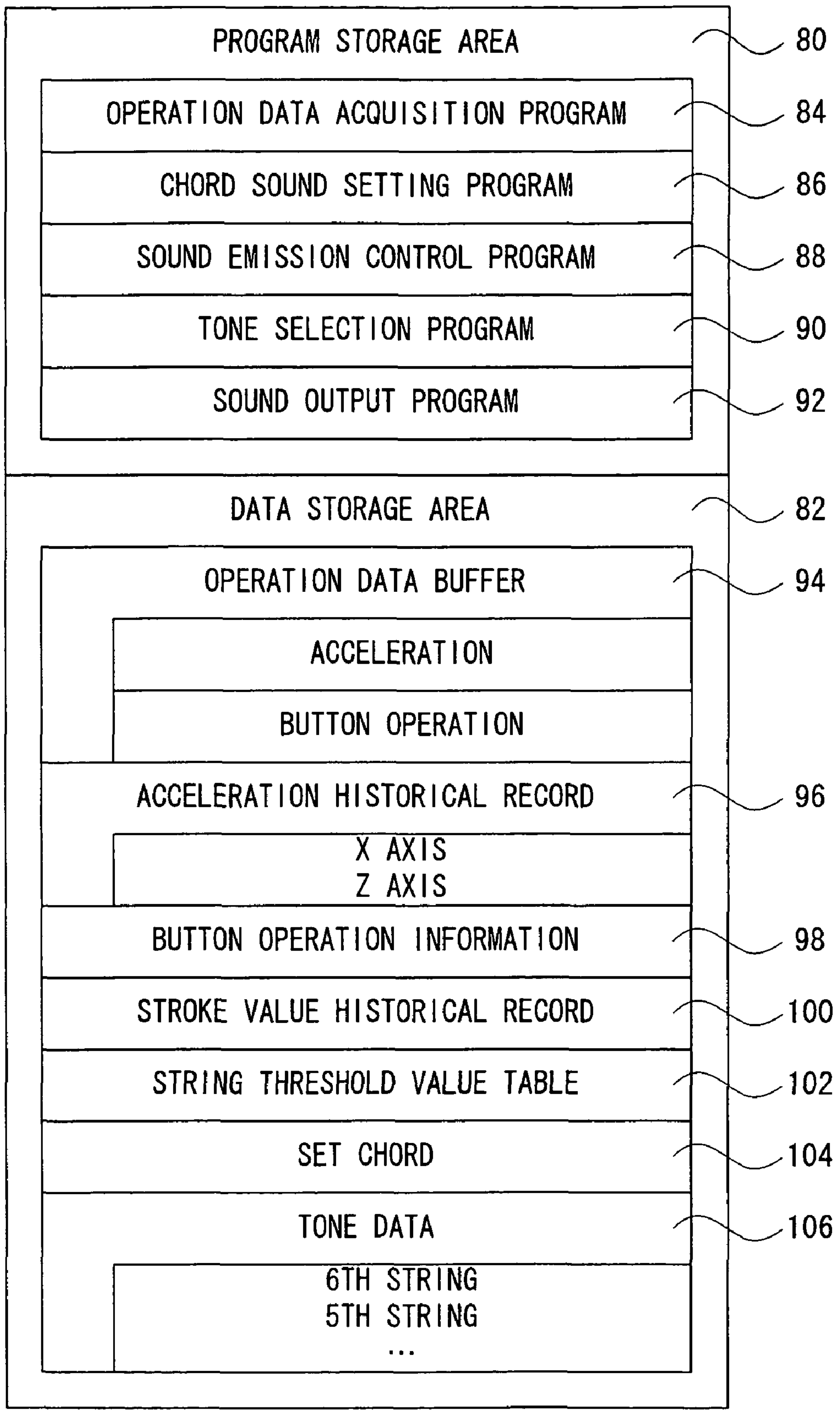
FIG. 7 is an illustrative view showing one example of memory map.

FIG. 7 shows one example of memory map. The main memory 28 includes a program storage area 80 and a data storage area 82. FIG. 7 represents a part of the memory map, and the main memory 28 also stores other programs and data required for sound output control process, which are read from the optical disc 20, etc., generated or acquired by the CPU 26.

A storage area 84 of the program storage area 80 stores an operation data acquisition program. By this program, the operation data from the controller 14 is acquired in the main memory 28 via the receiving unit 18 and the controller I/F 38. As mentioned above, the controller 14 transmits operation data in a cycle shorter than one frame with the game apparatus 12 (e.g. 1/60 second). In addition, the sampling cycle of the acceleration sensor 60 in the controller 14 is set as a cycle shorter than one frame with the game apparatus 12 (e.g. 1/200 second). The data transmitted on a single occasion from the controller 14 includes the values of accelerations with a plurality of detection timings. Thus, in this embodiment, the game apparatus 12 can acquire operation data in which a plurality of pieces of operation information (acceleration, etc.) are included in one frame. The CPU 26 can execute a sound output control process using a plurality of pieces of operation information as required.

The storage area 86 stores a chord sound setting program. This program makes it possible to set chord sounds. The guitar chords capable of being set in this embodiment includes C, G7, Am, F, Dm, etc. In this embodiment, a chord is selected using the cross key 52*a* out of the operating switch 52, for example. In addition, the tone of sound of each string is set according to the set chord. That is, the sound of each string is taken as a component of a chord. Accordingly, it is possible to produce chords in the same manner as a real guitar makes.

A storage area 88 stores a sound emission control program. This program controls the presence or absence of sound output. More specifically, in this embodiment, the sound output is switched on or off depending on whether the A button 52*d* out of the operating switch 52 is pressed or not. That is, a sound is output when the A button 52*d* is pressed, and no sound is output when the A button 52*d* is not pressed. Therefore, the user is allowed to produce or not to produce the sound of a predetermined string by pressing or releasing the A button 52*d* during the operation. On the contrary, in another embodiment, the sound may be deadened when the A button 52*d* is pressed.

A storage area 90 stores a tone selection program. This program makes it possible to select a tone of sound to be output according to a change in acceleration. More specifically, it is determined by this program whether or not a change in stroke value has formed a predetermined relationship with the threshold value associated with each string. Then, when it is determined that the predetermined relationship has been established, the sound set for the string is selected. More specifically, it is determined whether or not the threshold value of any string exists between the stroke value of the current frame and the stroke value of the previous frame. This means that it is investigated which string has been plucked between the previous frame and the current frame. More specifically, in normal downstroke, it is determined whether or not the threshold value of each string is equal to or more than the stroke value of the previous frame and is less than the stroke value of the current frame. Additionally, as for upstroke, it is determined whether or not the threshold value of each string is equal to or more than the stroke value of the current frame and is less than the stroke value of the previous frame.

A storage area 92 stores a sound output program. By this program, control data for sound output is generated and a sound is output based on the control data.

A storage area 94 of the data storage area 82 is an operation data buffer that stores operation data transmitted from the controller 14. As stated above, since the operation data including a plurality of pieces of operation information is received from the controller 14 at least once within a time period of one frame with the game apparatus 12, the received operation data is sequentially stored in the storage area 94. The operation data includes acceleration data indicating accelerations of X, Y and Z axes detected by the acceleration sensor 60 and button operation data indicating the presence or absence of each button operation on the operating part 52.

A storage area 96 stores a historical record of acceleration. This area holds the values of accelerations for a predetermined number of frames. In this embodiment, since the acceleration values of X and Z axes are used, the accelerations of X and Z axes are obtained from the operation data buffer and stored in the storage area 96. Since a plurality of acceleration values are obtained from one frame as stated above, the mean value of the plurality of values may be taken. Alternatively, the maximum value or the minimum value may be employed.

A storage area 98 stores button operation information that indicates a button being used in the current frame, based on the button operation data obtained from the operation data buffer 94.

A storage area 100 stores a historical record of stroke value. The stroke value represents the sum of the acceleration values in the X-axis direction and the Z-axis direction, as mentioned above. The storage area 100 stores the stroke values of at least the current and previous frames.

Figures 8, 9:
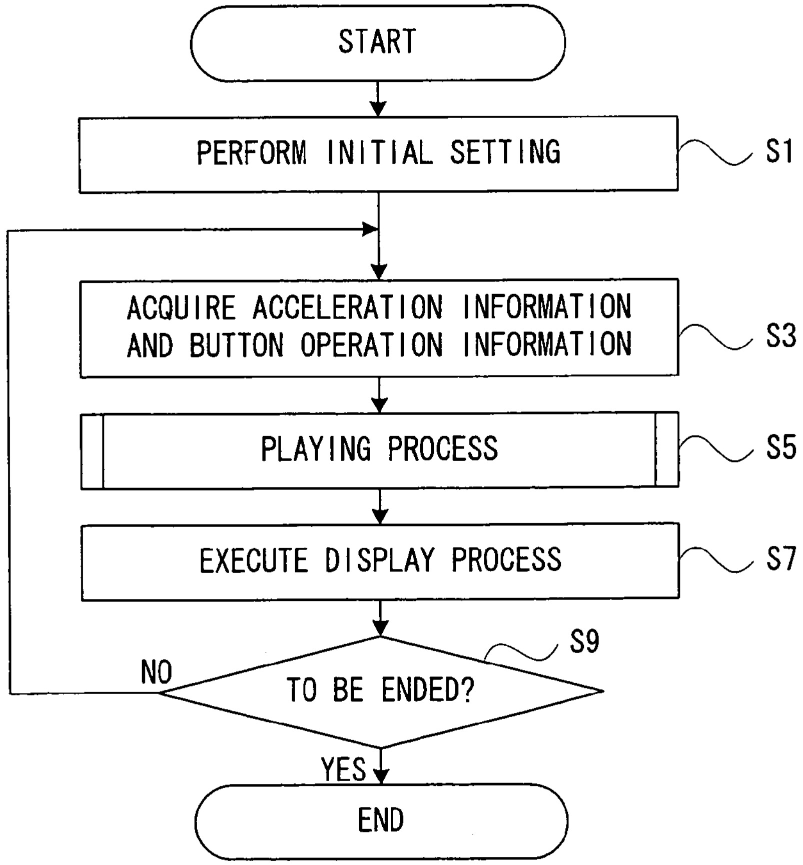
FIG. 8 is an illustrative view showing one example of string threshold value table data.
FIG. 9 is a flowchart showing one example of operation of the game apparatus.

A storage area 102 stores a string threshold value table read from the optical disc 20. The string threshold value table holds the threshold values indicative of the positions of the strings for comparison with a change in stroke value. As shown in FIG. 8, the threshold values are registered in association with string numbers indicative of string identification information. In this embodiment, the threshold value of the sixth string is 0.25, and the threshold values from the sixth to first strings are set in step of 0.1. It is determined whether a change in stroke value has exceeded any of those threshold values or not. Although the values of the threshold value table shown in FIG. 8 are for operation by right hand as illustrated in FIG. 5, the string threshold value table storage area 102 also stores a table for operation by left hand. The user selects which hand to use for an operation from a setting screen not illustrated, and then the table to be referred to is decided according to the selection.

A storage area 104 stores a set chord. For instance, the chord is C by default and is changed according to the operation of the cross key 52*a*. As an example, a portion for designating an upward direction of the cross key 52*a* is associated with G7, a portion for an downward direction thereof is associated with F, a portion for a rightward direction is associated with Am, and a portion for a leftward direction is associated with Dm, respectively. When any of those direction designating portions is pressed down, the chord associated with the portion is selected. Also, when the portion indicative of the direction opposite to the selected chord is pressed down, the chord is deselected and the default C is selected.

A storage area 106 stores tone data. The tone data indicates the tone of each string. The storage area 106 stores data for designating sound data on tone of each string constituting the chord selected according to the chord setting.

FIG. 9 shows one example of operation of sound output control process on the game apparatus 12. Firstly, the CPU 26 executes an initial setting in a step S1. By this execution, the main memory 28 is cleared, and required programs and data are read from the optical disc 20 to the main memory 28. The CPU 26 also sets initial values to various variables and flags.

The processes of succeeding steps S3 to S9 are executed frame by frame. The CPU 26 acquires acceleration information and button operation information in the step S3. More specifically, the CPU 26 reads operation data from the operation data buffer 94, and acquires and stores acceleration values in the X-axis and Z-axis directions in an acceleration historical record storage area 96, and stores operation information of each button 52 in the button operation information storage area 98.

Subsequently, the CPU 26 executes a playing process in a step S5. By the playing process, sound is output according to the user's stroke operation of the controller 14. One example of operation of the playing process is provided in detail in FIG. 10.

Figure 10:
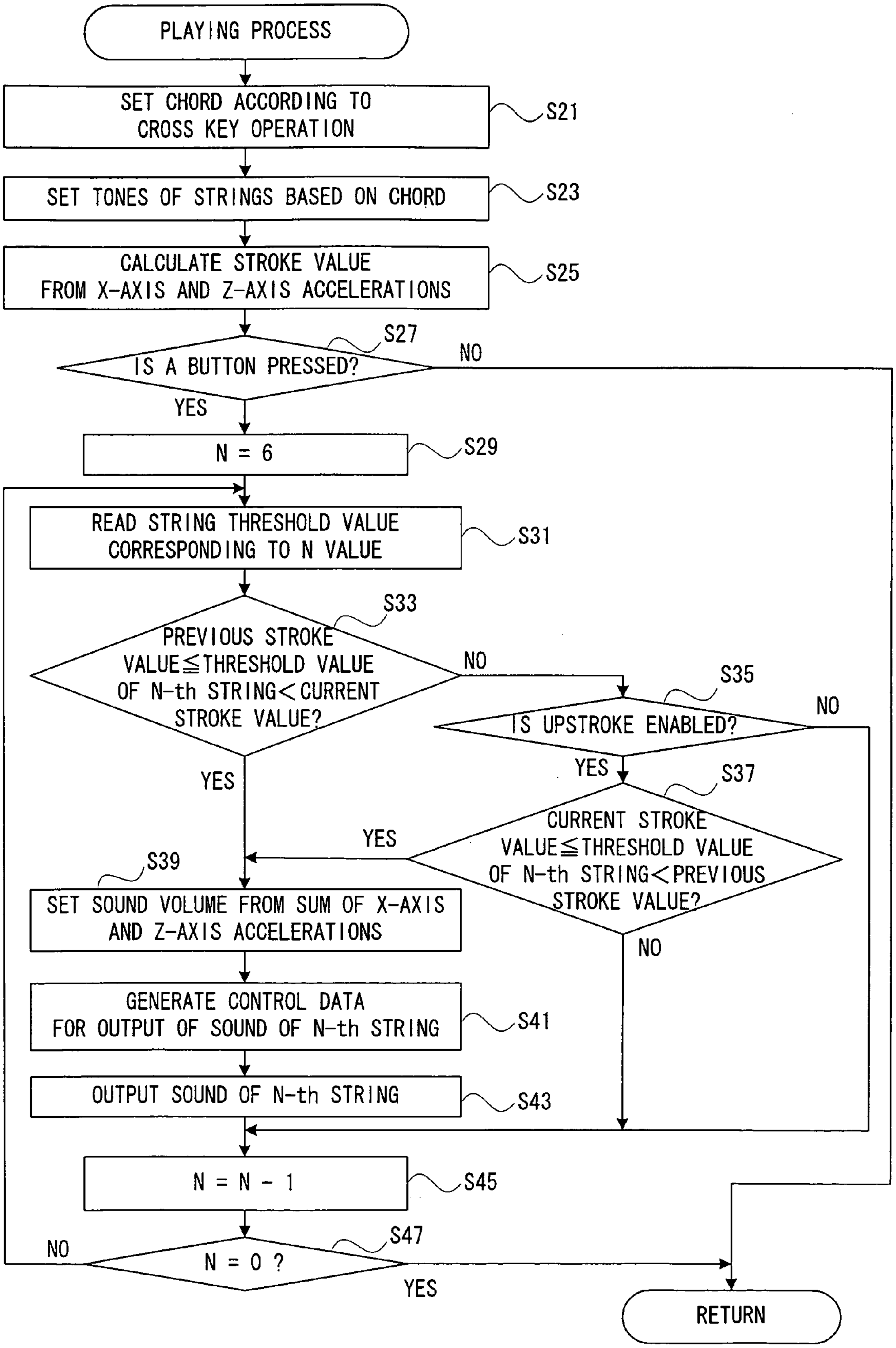
FIG. 10 is a flowchart showing one example of operation of playing process in FIG. 9.

In a step S21 of FIG. 10, the CPU 26 sets a chord according to the cross key operation. More specifically, the operation information of the cross key 52*a* is acquired from the button operation information storage area 98, the chord is selected on the basis of the direction in which the cross key 52*a* was operated, and the information indicative of the selected chord is stored in the storage area 104. The set chord storage area 104 already stores the information indicative of the C chord as an initial setting. The set chord will be never changed without operation of the cross key 52*a*.

Then, in a step S23, the CPU 26 sets the tone of each string based on the set chord, and stores the information indicative of the tone of each string in the tone data storage area 106.

In a step S25, the CPU 26 reads the acceleration values of the current frame in the X-axis and Z-axis directions, and calculates a stroke value by adding those values together. The calculated stroke value of the current frame is stored in the stroke value historical record storage area 100.

Subsequently, in a step S27, the CPU 26 determines whether the A button has been pressed or not, based on the data in the button operation information storage area 98. That is, the CPU 26 determines whether the user has designated sound output or not. If "NO" in the step S27, that is, if the user does not intend to output any sound, the CPU 26 terminates the playing process and then returns the process to the step S7 of FIG. 9.

On the other hand, if "YES" in the step S27, the CPU 26 determines whether each string has been plucked or not, based on a change in stroke value. That is, the CPU 26 sets an initial value to a variable N for designating a target string in a step S29 ("6" indicative of the sixth string in this embodiment).

Subsequently, in a step S31, the CPU 26 reads the threshold value of the string corresponding to the value N from the threshold value table storage area 102. Then, in a step S33, the CPU 26 determines whether or not the threshold value of the N-th string is equal to or more than the stroke value of the previous frame and is less than the stroke value of the current frame. Here, the CPU 26 determines whether or not the stroke value has passed through the threshold value of the N-th string from bottom up, that is, whether or not the N-th string has been plucked by a downstroke from top down. If "YES" in the step S33, the CPU 26 moves the process to a step S39 to output the sound of the N-th string.

On the other hand, if "NO" in the step S33, the CPU 26 determines in a step S35 whether it is possible to perform an upstroke or not. This determination is made on the basis of the flag indicating the possibility of an upstroke stored in the data storage area 82. If the sound output is to be permitted in an upstroke as well as a downstroke, the above mentioned flag is provided with information indicative of the permission at a time of initial setting, for example. The setting on the possibility of an upstroke can be changed on a setting screen or the like not shown, by the user's manipulation of the operating button 52.

If "YES" in the step S35, the CPU 26 determines in a step S37 whether or not the threshold value of the N-th string is equal to or more than the stroke value of the current frame and is less than the stroke value of the previous frame. Here, the CPU 26 determines whether or not the stroke value has passed through the threshold value of the N-th string from top down, that is, whether or not the N-th string has been plucked by an upstroke from bottom up. If "YES" in the step S37, the CPU 26 moves the process to the step S39 to output the sound of the N-th string.

On the other hand, if "NO" in the step S37, that is, if the N-th string as a process target has not been plucked, the CPU 26 moves the process to a step S45 to exercise control over the next string. In addition, if "NO" in the step S35 as well, the CPU 26 moves the process to the step S45.

In the step S39, the CPU 26 sets sound volume from the sum of the acceleration values in the X-axis and Z-axis direction. More specifically, the CPU 26 uses the current and previous stroke values as sum of the X-axis and Z-axis accelerations s to calculate the sound volume based on an absolute value of a difference between the stroke value of the current frame and the stroke value of the previous frame. Since the stroke value indicates "position" of the stroke operation and a difference in the "position" represents "speed" of the stroke operation, this "speed" is converted on a scale of sound volume. The more quickly the stroke operation is performed, the more the sound volume is increased.

In a step S41, the CPU 26 generates control data for outputting the sound of the N-th string. More specifically, the CPU 26 reads the tone data set to the N-th string from the storage area 106, and generates control data including information for designating output of the tone at a set sound volume.

Then, in a step S43, the CPU 26 outputs the sound of the N-th string. More specifically, the CPU 26 provides the DSP 34 via the memory controller 30 with the control data for outputting the sound of the N-th string. According to the control data, the DSP 34 uses sound waveform data stored in the ARAM 36 to generate data for outputting the sound, and provides the data to the audio I/F 44 via the memory controller 30. The audio I/F 44 provides the speaker 24 with an audio signal for outputting the sound, based on the data for outputting the sound. This allows the sound of the N-th string to be output from the speaker 24.

In a step S45, the CPU 26 subtracts 1 from the value of the variable N and sets the next string as a process target. Then, in a step S47, the CPU 26 determines whether the value of the variable N has reached 0 or not. That is, the CPU 26 determines whether comparison of all the threshold values of the strings to a change in stroke value has been completed or not. If "NO" in the step S47, the CPU 26 returns the process to the step S31 to perform a process on the next string. As stated above, the plucked string is identified according to a change in stroke value, and the sound of the string is output. On the other hand, if "YES" in the step S47, the CPU 26 terminates the playing process and returns the process to the step S7 of FIG. 9.

In the step S7 of FIG. 9, the CPU 26 executes a display process. In this process, the CPU 26 generates data for displaying a screen using the GPU 32 and displays the generated screen on the monitor 16. The screen may present a description of the manners in which the controller 14 is held and a stroke operation is performed, etc.

In the step S9, the CPU 26 determines whether or not to end the simulative playing. For example, the CPU 26 determines whether any operating switch 52 for designating the end of the simulative playing has been pressed or not, based on the button operation information. If "NO" in the step S9, the CPU 26 returns the process to the step S3 to continue the sound output control according to the user's stroke operation. If "YES", the CPU 26 ends the sound output control process.

According to this embodiment, the controller 14 to be operated by the user is provided with the acceleration sensor 60 for detecting accelerations of at least two axes so that a sound is controlled according to a change in sum of the accelerations of the two axes detected by the acceleration sensor 60, that is, according to the state of the stroke operation. This allows simulative playing by performing a wristy operation like stroke performance on a guitar. This also allows a performance that cannot be reproduced by a simple pointing operation because the sound output can be controlled according to the state of an operation such as the swing of the controller 14, thereby making it possible to output entertaining sound never before possible.

Figure 11:
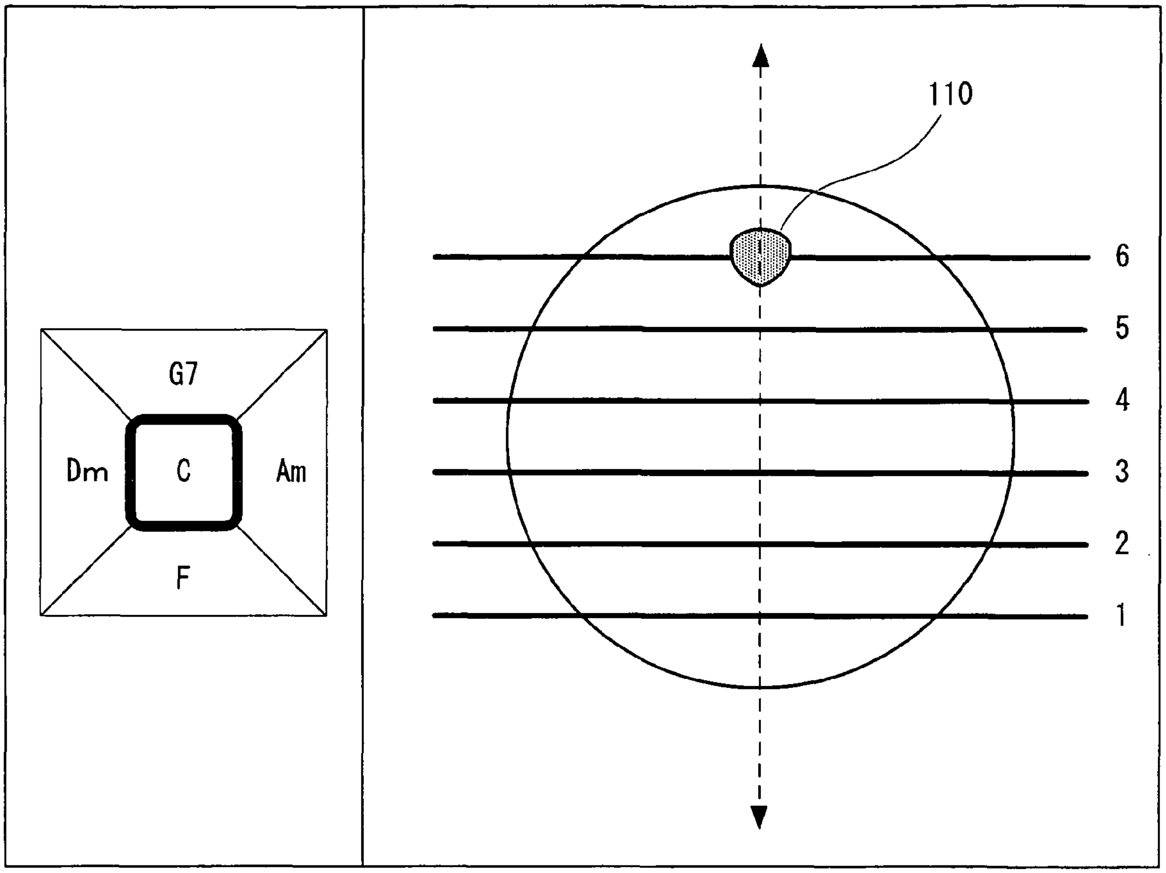
FIG. 11 is an illustrative view showing one example of display screen.

In another embodiment, in the display process in the step S7 of FIG. 9, a screen presenting the state of the user's stroke operation (playing position) may be provided as shown in FIG. 11, for example. As illustrated in FIG. 11, an icon 110 symbolizing a pick is displayed together with six guitar strings in a right portion of the screen, as an example. In this screen, the sixth to first strings are arranged in positions corresponding to their individual threshold values. Additionally, the pick icon 110 is displayed in a position corresponding to the stroke value and moved vertically according to the stroke operation. Such screen display clearly shows the user a positional relationship between the user's stroke operation and the string. Thus, the user can minutely check which string is being plucked by his/her stroke operation and understand what stroke operation will be appropriate, and thus he/she can carry out simulative stroke performance more easily.

However, since the sound of each string can be output according to a change in stroke value by moving the controller 14 as if carrying out stroke performance, even the first-timer user can easily grasp a sense of operation for successful sound output by a stroke operation using the controller 14 several times. Therefore, the screen display as shown in FIG. 11 may not be provided at all or may be presented only in beginner's mode or practice mode or the like.

Since the position of the pick icon 110 indicates the position of the stroke operation in the screen of FIG. 11, it is easy to switch between the presence and absence of sound output by means of the A button 52*d*. That is, by pressing the A button 52*d* when the pick icon 110 is passing through a desired string, the user can easily pluck the desired string alone. Besides, by switching the display pattern such as the color of the pick icon 110 depending on whether the A button 52*d* is operated or not, the user also can recognize visually the operating state of the A button 52*d* and control more easily sound output.

Moreover, as shown in FIG. 11, a chord table may be displayed for chord selection. In the above embodiment, as an example, since the chord is C by default and can be selected from among G7, F, Am and Dm by operating each direction designating portion of the cross key 52*a*, the chord table of FIG. 11 has C in the central position and G7, F, Dm and Am in the upper, lower, left and right positions, respectively. In addition, a cursor is provided in a portion indicative of the currently set (selected) chord (the C portion in FIG. 11). The cursor moves in accordance with the user's operation of the cross key 52*a*. For instance, when the upward direction portion of the cross key 52*a* is operated in a state shown in FIG. 11, the cursor moves to the G7 portion. After that, when the downward direction portion is operated, the cursor returns to the C portion. As stated above, by displaying the currently set chord and selectable chords, the user can easily select a chord.

Besides, the sound output control apparatus 10 structured as a guitar simulative playing system is described in relation to each of the above mentioned embodiments. However, as a matter of course, the sound output control apparatus 10 also allows simulative stroke performance on string instruments other than a guitar in which strings are to be plucked by fingers, such as ukulele and sitar.

Although example embodiments of the present invention have been described and illustrated in detail, it is clearly understood that the same is by way of illustration and example only and is not to be taken by way of limitation, the spirit and scope of the present invention being limited only by the terms of the appended claims.

What is claimed is:

1. A storage medium storing a sound output control program for a sound output control apparatus that outputs a sound from an output in accordance with manipulation of an operating device, wherein said operating device comprises an acceleration sensor for detecting accelerations in directions of at least two axes orthogonal to each other, said sound output control program allows a processor of said sound output control apparatus to execute:

an acquisition step of acquiring the accelerations detected by said acceleration sensor;

a calculation step of calculating sum of accelerations of two axes acquired in said acquisition step;

a sound control step of generating a control signal for sound output in accordance with a change in said sum of accelerations; and a sound output step of outputting a sound from said output based on said control signal.

2. A storage medium storing a sound output control program according to claim 1, wherein said sound control step includes a determination step of determining whether a change in said sum of accelerations has formed a predetermined relationship with any of a plurality of threshold values stored in a storage area, and when it is determined in said determination step that a change in said sum of accelerations has formed a predetermined relationship with said threshold value, said control signal for sound output is generated.

3. A storage medium storing a sound output control program according to claim 1, wherein, in said sound control step, a tone of sound to be output is selected on the basis of a change in said sum of accelerations.

4. A storage medium storing a sound output control program according to claim 1, wherein said operating device further comprises a sound emission instruction device for providing an instruction on whether or not to carry out sound output and, in said sound control step, presence or absence of the sound output is controlled in accordance with the instruction from said sound emission instruction device.

5. A sound output control apparatus for outputting a sound from an output in accordance with manipulation of an operating device having an acceleration sensor for detecting accelerations in at least two directions orthogonal to each other, comprising:

an acquisition programmed logic circuitry for acquiring the accelerations detected by said acceleration sensor;

a calculation programmed logic circuitry for calculating sum of accelerations of two axes acquired by said acceleration sensor;

a sound control programmed logic circuitry for generating a control signal for sound output in accordance with a change in said sum of accelerations; and a sound output for outputting a sound from said output based on said control signal.

6. A sound output control apparatus according to claim 5, wherein said sound control programmed logic circuitry determines whether a change in said sum of accelerations has formed a predetermined relationship with any of a plurality of threshold values stored in a storage area, and when it is determined that a change in said sum of accelerations has formed a predetermined relationship with said threshold value, said control signal for sound output is generated.

7. A sound output control apparatus according to claim 5, wherein a tone of sound to be output is selected, by said sound control programmed logic circuitry, on the basis of a change in said sum of accelerations.

8. A sound output control apparatus according to claim 5, wherein said operating device further comprises a sound emission instruction programmed logic circuitry for providing an instruction on whether or not to carry out sound output and, presence or absence of the sound output is controlled, by said sound control programmed logic circuitry, in accordance with the instruction from said sound emission instruction programmed logic circuitry.

* * * * *